US008103224B1

(12) United States Patent
Faravash et al.

(10) Patent No.: US 8,103,224 B1
(45) Date of Patent: Jan. 24, 2012

(54) METHOD AND APPARATUS FOR THE INTEGRATION OF A HIGH EFFICIENCY POWER AMPLIFIER WITH AN INTEGRATED TRANSCEIVER FOR WIRELESS COMMUNICATION

(75) Inventors: Shayan Faravash, Cupertino, CA (US); Matthew C. Romney, Alpine, UT (US); Chee Kwang Quek, Sunnyvale, CA (US); Robert A. Koupal, San Leandro, CA (US); David A. Schwan, San Jose, CA (US); Nathaniel King, Jr., Morgan Hill, CA (US)

(73) Assignee: RF Micro Devices, Inc., Greensboro, NC (US)

( * ) Notice: Subject to any disclaimer, the term of this patent is extended or adjusted under 35 U.S.C. 154(b) by 592 days.

(21) Appl. No.: 11/900,688

(22) Filed: Sep. 12, 2007

Related U.S. Application Data (60) Provisional application No. 60/845,880, filed on Sep. 19, 2006.

(51) Int. Cl.
*H04B 1/02* (2006.01)
(52) U.S. Cl. ... 455/91; 455/63.1; 455/67.13; 455/550.1; 455/552.1; 455/570; 455/114.1; 455/114.3; 375/267; 375/295; 375/296; 375/297
(58) Field of Classification Search ............... 455/126, 455/234.6, 333, 552.1, 110, 91, 63.1, 67.13, 455/550.1, 570, 114.1, 114.3; 331/177 V; 375/297, 295, 267, 296; 333/189
See application file for complete search history.

(56) References Cited

U.S. PATENT DOCUMENTS

| | | | |
|---|---|---|---|
| 7,199,684 B2 * | 4/2007 | Aigner et al. | 333/189 |
| 7,667,916 B1 * | 2/2010 | Aram | 360/67 |
| 2003/0231063 A1 * | 12/2003 | Cali et al. | 330/301 |
| 2004/0087285 A1 * | 5/2004 | Black et al. | 455/126 |
| 2004/0248614 A1 * | 12/2004 | Ella | 455/552.1 |
| 2005/0195037 A1 * | 9/2005 | Dupuis et al. | 330/279 |
| 2005/0220217 A1 * | 10/2005 | Yamawaki et al. | 375/297 |
| 2006/0050806 A1 * | 3/2006 | Li | 375/295 |
| 2006/0114074 A1 * | 6/2006 | Matsui et al. | 331/177 V |
| 2006/0128347 A1 * | 6/2006 | Piriyapoksombut et al. | 455/333 |
| 2006/0234668 A1 * | 10/2006 | Uchitomi et al. | 455/333 |
| 2007/0135064 A1 * | 6/2007 | Ruelke et al. | 455/110 |
| 2007/0223615 A1 * | 9/2007 | Dosanjh et al. | 375/267 |
| 2008/0261650 A1 * | 10/2008 | Piriyapoksombut et al. | 455/552.1 |
| 2009/0061803 A1 * | 3/2009 | Hadjichristos | 455/234.2 |

* cited by examiner

*Primary Examiner* — Junpeng Chen
(74) *Attorney, Agent, or Firm* — Withrow & Terranova, P.L.L.C.

(57) ABSTRACT

An integrated transceiver for wireless applications has both a frequency determining means and a power amplifier. A transmission filter suppresses unwanted spurious outputs in an integrated circuit before a power amplifier stage amplifies and transmits the desired signal. A differential to single ended converter is able to be implemented to further enhance efficiency.

14 Claims, 6 Drawing Sheets

METHOD AND APPARATUS FOR THE INTEGRATION OF A HIGH EFFICIENCY POWER AMPLIFIER WITH AN INTEGRATED TRANSCEIVER FOR WIRELESS COMMUNICATION

CROSS REFERENCE TO RELATED APPLICATIONS

This application claims priority of provisional application Ser. No. 60/845,880, filed Sep. 19, 2006, entitled EFFICIENT INTEGRATED POWER AMPLIFIER AND TRANSCEIVER FOR WIRELESS, which is incorporated herein by reference.

FIELD OF INVENTION

The present invention relates to the field of integrated circuits. More particularly, the present invention relates to the field of integrated circuit design of phase locked loops and power amplifiers (PA) as part of a fully integrated transceiver.

BACKGROUND OF INVENTION

Integrated circuits (IC) used in wireless or other communications generally comprise a frequency synthesis means. The phase locked loop (PLL) is a common method of frequency synthesis. A PLL normally includes a phase detector and a voltage controlled oscillator (VCO). A PLL can also include a divider, loop filter, or a number of other devices depending on the intended output frequency of the PLL.

In transceivers for wireless communications, usually a mixer is used for frequency upconversion. In the mixer, the baseband, information-bearing signal is "mixed" with the local oscillator signal from the aforementioned frequency synthesizer to generate a passband signal, which is buffered by an on-chip amplifier and sent to an external power amplifier.

One reason for using the power amplifier externally is that unwanted interaction between the power amplifier and the rest of the transmission circuitry, such as the frequency determining circuitry, can cause detrimental effects, such as frequency pulling. Frequency pulling can manifest itself as errors in the output of the frequency determining circuitry due to unwanted interaction between the PLL and the PA. These errors in the frequency can lead to a receiver being unable to receive the transmitted signal.

Frequency pulling generally occurs because the PA and the PLL are operating at similar frequencies which can cause interaction between signals in the two circuits. This problem is mitigated in the current generation of designs by introducing modulation between the frequency determining circuitry and the PA. By way of example, the PLL could be operating at 2 GHz and the PA could be operating at 1 GHz. That way, the harmful emissions from the PA will be well below the operating frequency of the PLL, causing no harmful interaction between the two.

However, this modulation, or dividing or multiplying of the frequency, can cause spurious outputs from the divider. Spurious outputs are caused by non-ideal parameters inherent to substantially all integrated circuits, such as non-linearity and mismatching. These spurious outputs have frequency components that can violate the transmission mask. The transmission mask, or spectral mask, is a mathematically defined set of lines applied to the levels of radio (or optical) transmissions. The spectral mask is generally intended to reduce interference with other wireless apparatuses that are physically close to the transmitter by limiting excessive radiation at frequencies beyond the necessary bandwidth. Furthermore, transmission masks of a certain shape for a given wireless communications appliances are usually mandated by the FCC. Attenuation of these spurious emissions is usually done with a bandpass filter, also known as a transmission (TX) filter, tuned to allow the correct frequencies of the transmitted signal through an antenna. Additionally, by placing the TX filter after the power amplifier, the TX filter must be of a higher order to obtain equivalent overall suppression of the spurious outputs. Higher order filters typically cause some loss in the desired passband, which has a detrimental effect on the overall efficiency of the system. In other words, more electric power is required to transmit an equivalent filtered signal than an equivalent unfiltered signal.

The fact that the power amplifier is external and separate further exposes the fundamental problems with the current solution. Each individual chip will typically require several passive external components such as resistors and capacitors, increasing the bill of materials and the complexity of the resulting circuit. The cost rises not only due to the materials themselves but also due to the increased assembly and test time the additional units require. Also, in the prior art, the PA is usually implemented in differential form to prevent any spurious outputs at the PA output to interfere with the PLL. Differential PAs consume greater power than their single ended counterparts, leading to lower overall efficiency in the integrated circuit.

Figure 1:
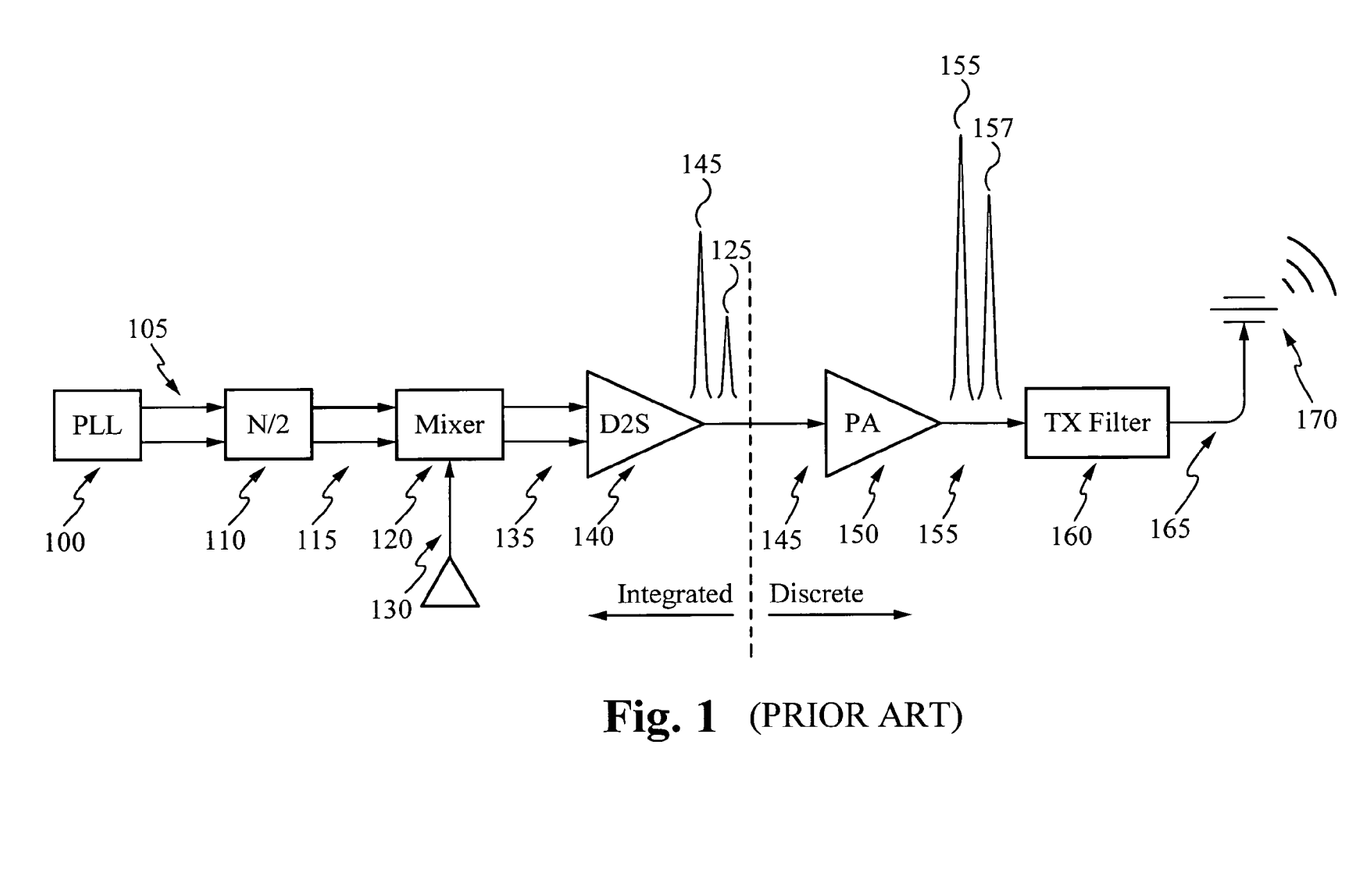
FIG. 1: The current generation of TX chains that are two or more discrete components. (Prior Art)

FIG. 1 shows certain aspects of the prior art and its shortcomings. The PLL 100 determines a differential output frequency 105 which is coupled as an input to a frequency divider 110. The output of the frequency divider 110 is coupled to a mixer 120. The frequency divider 110 is configured to transmit and the mixer 120 is configured to receive a divided differential frequency 115. As an unwanted consequence of frequency dividing, the divider also transmits spurious outputs 125. The mixer 120 combines this divided differential frequency 115, including spurious outputs 125 with an input signal 130. The input signal 130 can be voice, or data, or both. The mixer 120 transmits, and the differential to single ended converter (D2S) 140 is configured to receive, a differential modulated signal 135. The spurious outputs 125 are also undesirably transmitted with the differential modulated signal 135. In current practice, the rest of the TX chain is external to the integrated circuit. The D2S 140 transmits, and an external PA 150 is configured to receive, a single ended signal 145. The D2S 140 also transmits and the external PA 150 also receives the unwanted spurious outputs 125. The respective magnitudes of the single ended signal 145, which is the desired signal, and the spurious outputs 125 are represented as spikes between the D2S 140 and PA 150. The external PA 150 amplifies the single ended signal 145 but also amplifies the unwanted spurious output 125. The external PA 150 transmits, and a TX filter 160 is configured to receive, an amplified signal 155. However, the TX filter 160 also receives unwanted amplified spurious outputs 157. The respective magnitudes of the amplified signal 155, which is the desired signal, and the amplified spurious outputs 157 are represented as spikes between the PA 150 and TX filter 160. A person of ordinary skill in the art of integrated circuit design will appreciate that the difference in magnitude between the amplified signal 155 and amplified spurious output 157 will be less than the difference in magnitude between the single ended signal 145 and spurious output 125. In case of high efficiency power amplifiers, such as class AB or class C, unwanted spurious signals experience much higher gain compared to the desired signal 155 due to gain compression in the power amplifier. Rapid growth of the spurious signals by such non-linear (yet highly efficient) PAs is the main reason why presence of a TX filter after the PA is unavoidable. The TX filter 160 usually is a filter of multiple orders to sufficiently attenuate the amplified spurious outputs 157 such that the transmission mask conforms to a predetermined limit or an FCC limit. The TX filter 160 transmits, and an antenna 170 is configured to receive, a filtered signal 165. Because of the multiple orders of filtering, the TX filter 160 will also undesirably attenuate the amplified signal 155. To compensate for this, the bias current of the external PA 150 will have to be increased so that its output power will increase, causing an overall decrease in efficiency and battery life.

Figure 1A:
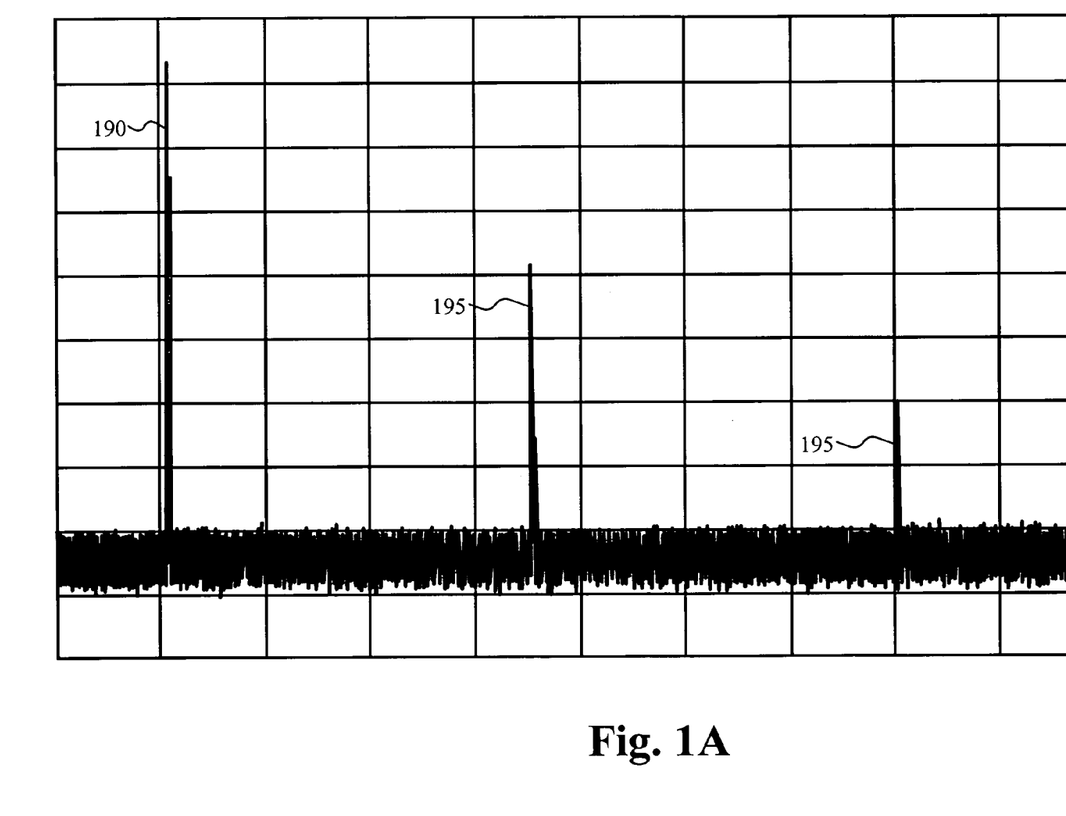
FIG. 1A: Frequency domain representation showing a desired frequency and spurious outputs. (Prior Art)

FIG. 1A is a representation of such spurious outputs in the frequency domain. By way of example, a desired differential output signal 190 is formed in the spectrum. Non-ideal characteristics, such as non-linearity and imperfect matching that are inherent to most integrated circuits form spurious outputs 195. The spurious outputs 195 can be random or they can be a harmonic of the desired signal 190. Regardless of the way that they are formed or whether they are random, harmonic or periodic, spurious outputs are preferably suppressed for optimum performance. If not suppressed, the spurious outputs can interfere with not only the rest of the circuitry on the integrated circuit, but also other integrated circuits in the appliance, or other appliances nearby.

The difficulties that arise in integrating the PLL and PA together discussed above require a new architecture along with corresponding circuits to realize a PLL and a PA, configured to work at present day wireless communication frequencies, integrated onto one semiconductor substrate.

SUMMARY OF THE INVENTION

Figure 2:
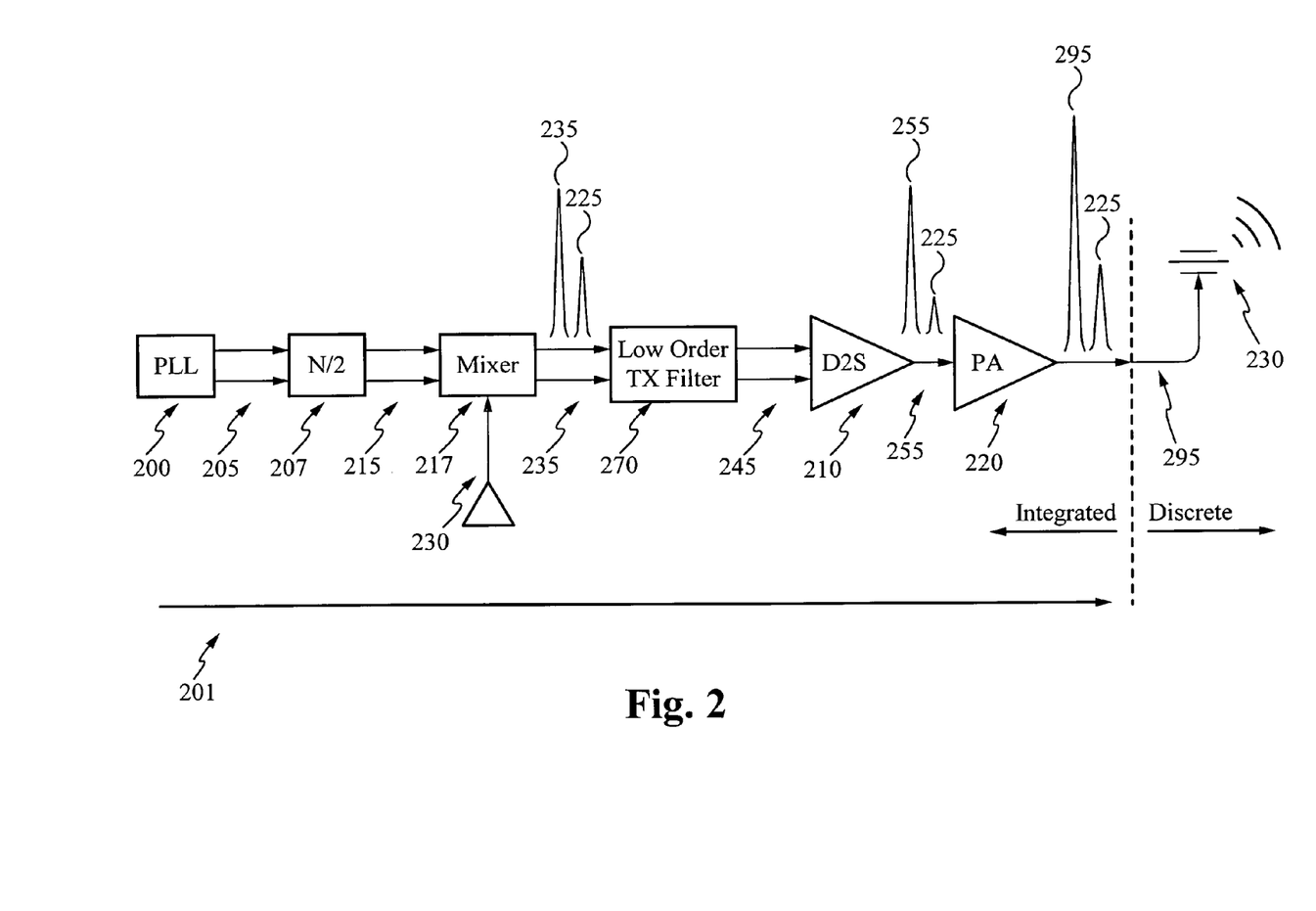
FIG. 2: The preferred embodiment of the present invention, showing all circuit elements in the preferred chain

In the preferred embodiment of the invention, a transmission filter implemented to reject spurious outputs that can violate a transmission mask is integrated into a single integrated circuit. A PLL generates a differential output frequency and is coupled to a divider that is configured to receive the differential output frequency and transmit a differential divided frequency. The divider is preferably an N/2 divider. By way of example, if the PLL is operating at 5.8 GHz, the divided frequency is half, or 2.9 GHz. Other frequencies and other divider ratios may be used. The divider is in turn coupled to a mixer configured to receive the differential divided frequency and an input signal and combine them into a differential modulated signal. The input signal can comprise voice or data or both. The mixer is coupled to a transmission (TX) filter. The mixer transmits, and the TX filter is configured to receive, the differential modulated signal. The TX filter is configured to reject spurious emissions and outputs that result from the division of the output frequency mentioned above. One advantage over the current generation of transceivers lies not in the inclusion of the TX filter, but in the integration and topological location of the TX filter. In current practice, the TX filter is placed after the PA. Therefore, the spurious outputs are amplified before they are filtered. The amplified spurious outputs have a detrimental effect on the PLL manifested as frequency pulling. In the preferred embodiment, the TX filter is placed before the PA, when the signal is relatively small and low in power. This enables the TX filter to greatly reduce the presence of the spurious outputs. Since spurious signal never grow as large as in the prior art architecture, the invented architecture of FIG. 2 is more robust against undesired pulling of the PLL by the output of the power amplifier. Another advantage of this embodiment is that there will be lower loss due to the TX filter and, because of its placement earlier in the chain, there will be minimal affect on the overall efficiency of the circuit. Since the spurious components are filtered before entering the PA, a highly non-linear yet highly efficient class AB or class C PA can be used. In current practice, multiple orders of filtering is required to suppress the amplified spurious outputs, causing loss in the desired signal that must be overcome by increasing the bias current of the PA, which causes overall loss of efficiency. In the preferred embodiment of the invention, there is substantially no undesirable efficiency loss due to the TX filter since it is placed before the PA in the transceiver chain, allowing for greater efficiency and improved battery life.

In the preferred embodiment, the TX filter also acts as a gain stage. This gain stage relaxes the required output signal swing from the mixer. It comprises a differential cascode pair of transistors. The cascode stage also provides isolation between the mixer and the other circuit elements in the integrated circuit. Without this isolation, small imbalances of impedance between the filter and the other circuit elements in the integrated circuit can cause large common mode signals to propagate through the entire integrated circuit.

In the preferred embodiment of the invention, the TX filter is coupled to a Differential to Single-Ended Converter (D2S). The TX filter transmits, and the D2S is configured to receive, a differential filtered signal. The D2S converts the differential filtered signal to a single ended filtered signal. The D2S can be realized in any known or convenient manner, but preferably the D2S is balanced for both gain and load. In other words, each input of the differential to single ended converter must be matched in both gain and load to provide a balanced output. The D2S transmits, and the PA is configured to receive, the single ended filtered signal. The D2S allows the PA to operate in a single ended fashion. A single ended power amplifier typically consumes less power than its differential counterpart and in turn enhances efficiency, further enhancing battery life.

DETAILED DESCRIPTION OF THE DRAWINGS

Embodiments of the present invention are directed to an integrated circuit for wireless applications having both a phase locked loop and power amplifier. Those of ordinary skill in the art of integrated circuit design will realize that the following detailed description of the present invention is illustrative only and is not intended to be in any way limiting. Other embodiments of the present invention will readily suggest themselves to such skilled persons having the benefit of this disclosure.

Reference will now be made in detail to implementations of the present invention as illustrated in the accompanying drawings. The same reference indicators will be used throughout the drawings and the following detailed description to refer to the same or like parts. In the interest of clarity, not all of the routine features of the implementations described herein are shown and described. It will, of course, be appreciated that in the development of any such actual implementation, numerous implementation-specific decisions will be made to achieve the developer's specific goals, such as compliance with application and business related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art of integrated circuit design having the benefit of this disclosure.

FIG. 2 shows the preferred embodiment of the current invention. An integrated circuit for wireless communications comprises a PLL 200, divider 207, mixer 217, low order TX filter 270, D2S 210 and single ended PA 220 coupled along a signal path 201. The PLL 200 forms a differential output frequency 205. The PLL 200 transmits, and a divider 207 is configured to receive, the differential output frequency 205. The divider 207 can be configured to divide the differential output frequency 205 by any number. The divider 207 is coupled to a mixer 217. The mixer 217 is configured to receive, and the divider 207 is configured to transmit, a differential divided frequency 215. The mixer 217 combines the differential divided frequency 215 with an input signal 230. The input signal 230 can be voice, data or both. As a byproduct of frequency division, the divider 207 also transmits unwanted spurious outputs 225 which are also combined by the mixer 217 with the input signal 230 and the differential divided frequency 215. The mixer 217 is in turn coupled to a low order TX filter 270. The mixer 217 transmits, and low order TX filter 270 is configured to receive, a differential modulated signal 235. The respective magnitudes of the differential modulated signal 235, which is the desired signal, and spurious outputs 225 are represented as two spiked between the mixer 217 and the TX filter 270. Since the modulated signal 235 has not been amplified, the low order TX filter 270 can be of a lower order than the TX filter in prior art and still substantially suppress the spurious outputs 225. Such a low order TX filter 270 would consume less current, enhancing battery life, and also less area, improving overall cost. The low order TX filter 270 is coupled to a D2S 210. The low order TX filter 270 transmits, and the D2S 210 is configured to receive, a differential filtered signal 245. The D2S 210 is coupled to a single ended PA 220. The D2S 210 transmits, and the single ended PA 220 is configured to receive, a single ended signal 255. Alternatively, the low order TX filter 270 and D2S can be integrally formed. Further alternatively, the D2S 210 can be removed if circuit conditions require the signal path 201 to remain differential, and a differential power amplifier can be used to further suppress external noise. The respective magnitudes of the single ended signal 255 and the spurious outputs 225 are shown as two spikes between the D2S 210 and the PA 220. It will be appreciated that the magnitudes of the single ended signal 255 and the differential modulated signal 235 are substantially similar, and that the magnitude of the spurious output 225 has been substantially suppressed. Preferably, the single ended PA 220 in turn transmits an amplified signal 295 to an antenna 230 which is configured to receive the amplified signal 295 and transmit it.

Figure 3:
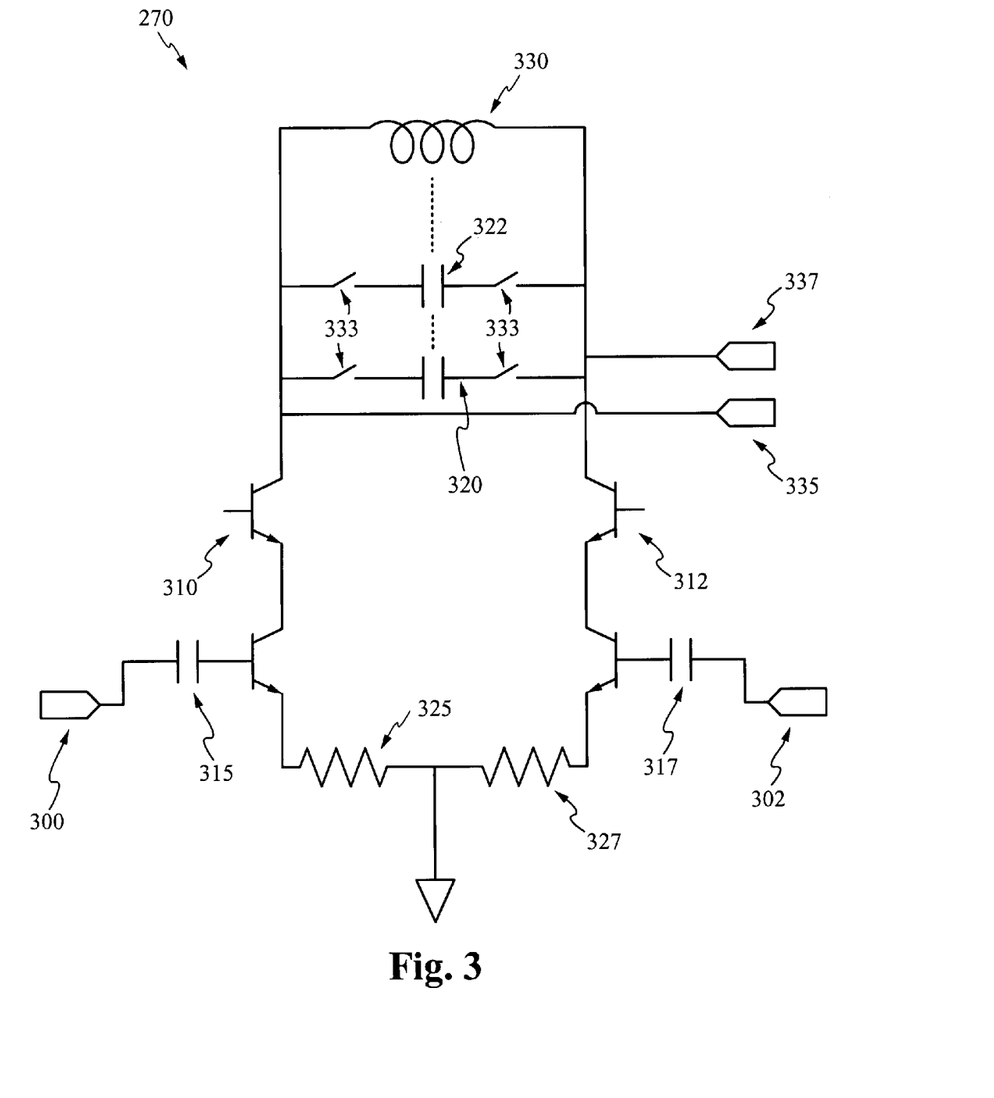
FIG. 3: The preferred embodiment of the transmission (TX) filter

FIG. 3 shows the preferred embodiment of the low order TX filter 270. The differential inputs 300 and 302 are coupled to a cascode stage via input coupling capacitors 315 and 317, respectively. The cascode stage preferably provides gain that relaxes the output swing requirement from the mixer 217 in FIG. 2. The cascode stage also provides isolation between the mixer 217 in FIG. 2 and the D2S 210 in FIG. 2. Without this isolation, even an apparently insignificant imbalance in impedance at the output of the mixer would result in large common mode signals propagating through the integrated circuit. In some embodiments, the load of the TX filter 270 is a tuned circuit comprising a bank of switched capacitors 320 and 322 and an inductor 330. The resistors 325 and 327 are preferably configured to be matched such that the differential outputs 335 and 337 are balanced. The pass frequency of the filter can be tuned post production by controlling which of the switches 333 that selectively couple capacitors 320 and 322 are open and closed. By changing which of the capacitors 320 and 322 are coupled to the circuit, the L-C time constant changes, thereby changing the pass frequency. In alternative embodiments, the pass frequency is able to be altered by changing the value of the inductor 330, or by including multiple inductors which are selectively coupled to the filter 270 through switches. In another alternative embodiment, the resistors 325 and 327 are able to be altered in a similar fashion, also changing the pass frequency. Furthermore, in other embodiments, the pass frequency is able to be altered by changing the value of any combination of the elements within the filter 270. It will be appreciated by those of ordinary skill in the art of integrated circuit design that many well known filter design methods are able to be implemented to realize the necessary passband.

Figure 4:
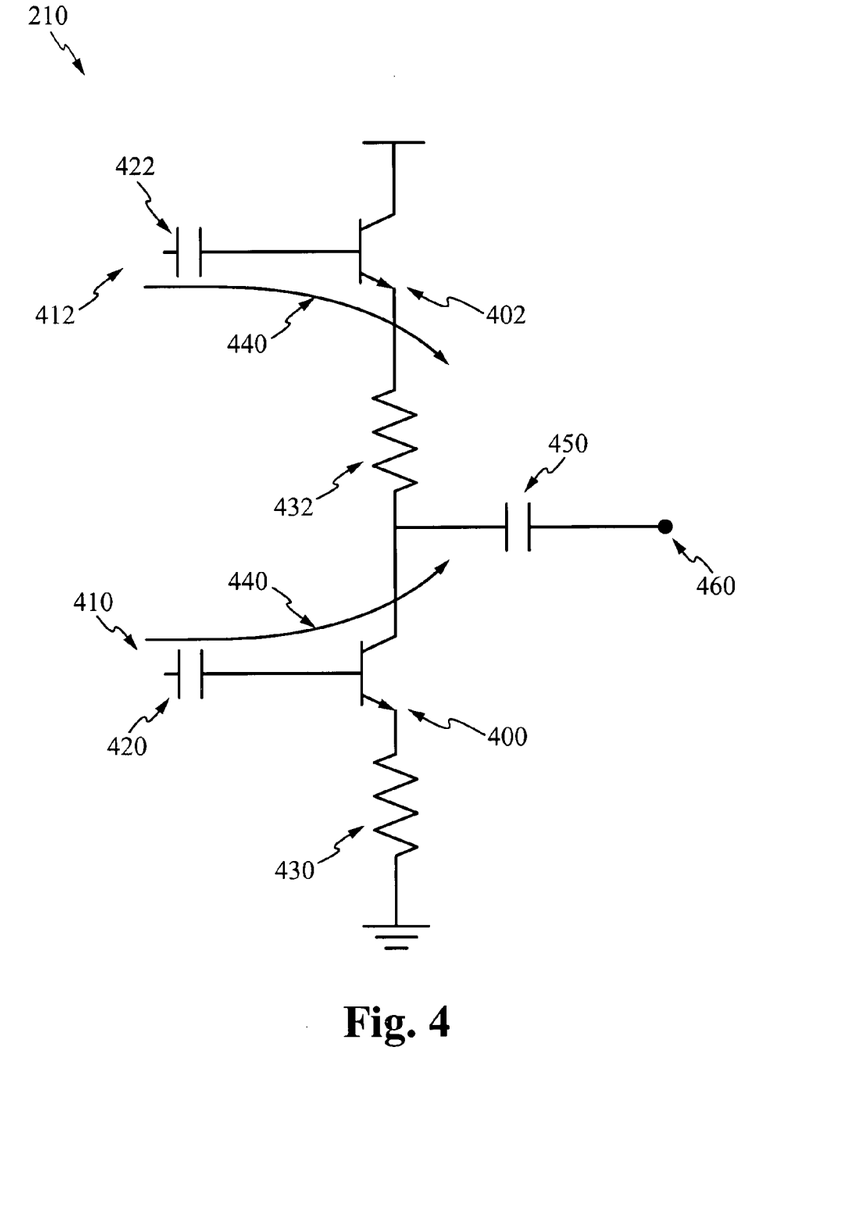
FIG. 4: The preferred embodiment of the differential to single ended converter

FIG. 4 shows one embodiment of the differential to single ended converter (D2S) 210. By way of example, the differential to single ended conversion is achieved by driving the base electrode of two stacked NPN transistors 400 and 402 each with their respective differential input signals 410 and 412 through input coupling capacitors 420 and 422. The gain through each respective signal path is preferably configured to be unity by coupling of the resistors 430 and 432 into their respective emitter circuits, assuring both paths 440 are matched and effective differential to single ended conversion is achieved. Preferably, an output coupling capacitor 450 coupled between the resistor 432 and collector of the transistor 400 removes any DC bias from the single ended output 460. In alternate embodiments, the D2S 210 is able to be implemented in any known or convenient manner. Alternatively, the low order TX filter 270 and D2S 210 are integrally formed.

Figure 5:
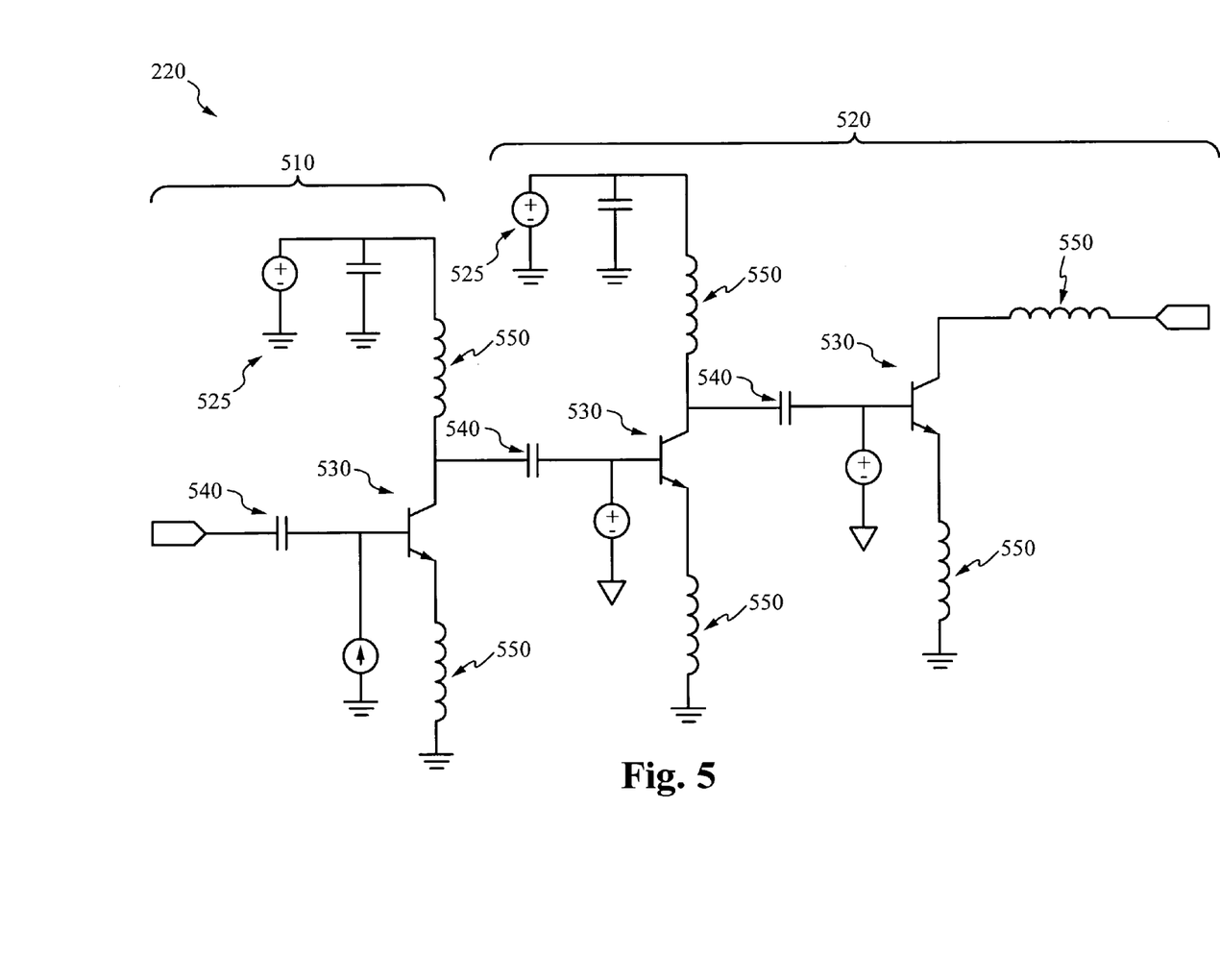
FIG. 5: The preferred embodiment of the power amplifier driver and the power amplifier.

FIG. 5 shows a more detailed schematic of the single ended power amplifier (PA) 220. The single ended PA 220 is comprised of a driver stage 510 and power stages 520. Preferably, each stage has its own power supply and supply bypass capacitor combination 525. Each transistor 530 is coupled to the next through a coupling capacitor 540 and each transistor 530 is optimally sized for greatest compression characteristics. The collectors of each transistor 530 are designed to take into account the parasitic inductors 550. Generally, metal traces on an integrated circuit or bondwires used to connect an integrated circuit to a package, or solder bumps used in wafer level packages have inherent inductance, which is referred to as parasitic inductance. At the multiple gigahertz of operation, even minuscule parasitic coupling between solder bumps, bondwires and circuit traces can cause great instability issues in the single ended PA 220.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention. For example, different logic circuit configurations could be substituted for the logic circuit described above to perform the functions of the embodiments illustrated.

We claim:

1. An integrated circuit for wireless communications comprising:
   A) a transmission filter within the integrated circuit having an input and an output, wherein the transmission filter is capable of having its pass frequency tuned after production, wherein the transmission filter comprises a cascode stage adapted to provide gain and provide isolation;
   B) a differential to single ended converter having an input and an output, wherein the input of the differential to single ended converter is directly coupled to the output of the transmission filter, wherein the differential to single ended converter comprises at least a transistor, a capacitor, and a resistor; and
   C) a power amplifier having an input and an output, wherein the input of the power amplifier is coupled to the output of the differential to single ended converter.

2. The integrated circuit in claim 1 wherein the output of the differential to single ended converter is directly coupled to the input of the power amplifier.

3. An integrated circuit for wireless communications comprising:
   a) a frequency determining module within the integrated circuit for transmitting a desired differential output frequency;
   b) a frequency divider coupled to the frequency determining module, configured to receive the desired differential output frequency and transmit a divided differential frequency;
   c) a mixer coupled to the frequency divider, configured to receive the divided differential frequency and an input signal, and transmit a differential modulated signal;
   d) a transmission filter coupled to the mixer, configured to receive the differential modulated signal and transmit a differential filtered signal, wherein the transmission filter is capable of having its pass frequency tuned after production, wherein the transmission filter comprises a cascode stage adapted to provide isolation between the mixer and a differential to single ended converter;
   e) the differential to single ended converter directly coupled to the transmission filter, configured to receive the differential filtered signal and transmit a single ended filtered signal, wherein the differential to single ended converter comprises at least a transistor, a capacitor, and a resistor, and;
   f) a power amplifier, coupled to the single ended filtered signal and transmit a single ended amplified signal.

4. The integrated circuit in claim 3 wherein the frequency determining module is a PLL.

5. The integrated circuit in claim 3 wherein the transmission filter comprises a bank of switched capacitors.

6. The integrated circuit in claim 3 wherein the transmission filter is a transmission filter having gain.

7. The integrated circuit in claim 3 wherein the differential to single ended converter is a balanced differential to single ended converter.

8. The integrated circuit in claim 3 wherein the power amplifier is a single ended power amplifier.

9. A method of integrating a frequency determining module and a power amplifier on the same integrated circuit comprising the steps:
   configuring a frequency determining module within the integrated circuit to transmit a desired differential frequency signal;
   coupling a frequency divider to the frequency determining module, and configuring the frequency divider to receive the desired differential frequency and to transmit a divided differential frequency signal;
   coupling a mixer to the frequency divider, and configuring the mixer to receive the divided differential frequency and an input signal, and to transmit a differential modulated signal;
   directly coupling a tunable transmission filter to the mixer, and configuring the transmission filter to receive the differential modulated signal and to transmit a differential filtered signal;
   directly coupling a differential to single ended converter comprising at least a transistor, a capacitor, and a resistor to the transmission filter, and configuring the differential to single ended converter to receive the filtered signal and to transmit a single ended filtered signal
   isolating the differential to single ended converter from the mixer using a cascode stage in the transmission filter; and
   coupling a power amplifier to the differential to single ended converter, and configuring the power amplifier to receive the single ended filtered signal and to transmit a single ended amplified signal.

10. The method in claim 9 wherein the frequency determining module is a PLL.

11. The method in claim 9 wherein the transmission filter is tunable post production by opening and closing one or more capacitors within a bank of capacitors.

12. The method in claim 9 wherein the transmission filter is a transmission filter with gain.

13. The method in claim 9 wherein the differential to single ended converter is a balanced differential to single ended converter.

14. The method in claim 9 wherein the power amplifier is a single ended power amplifier.

* * * * *